Aug. 6, 1963   R. D. SMITH   3,100,096
STREAMLINED HOUSING FOR AIRCRAFT SAFETY EQUIPMENT
Filed Nov. 14, 1962
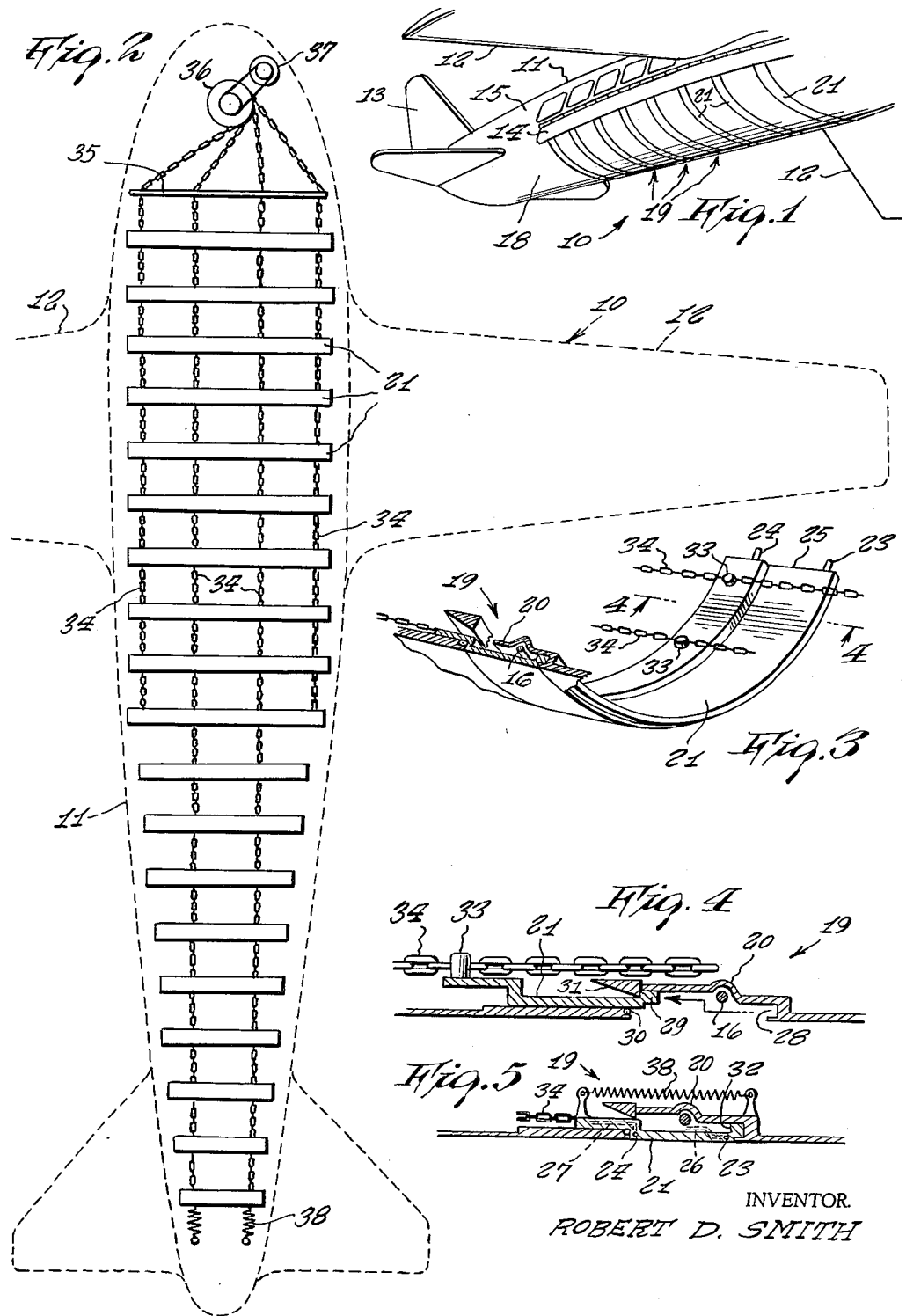
INVENTOR.
ROBERT D. SMITH

United States Patent Office 3,100,096
Patented Aug. 6, 1963

3,100,096
STREAMLINED HOUSING FOR AIRCRAFT
SAFETY EQUIPMENT
Robert D. Smith, 2742 E. Tremont Ave., Bronx 61, N.Y.
Filed Nov. 14, 1962, Ser. No. 237,631
3 Claims. (Cl. 244—117)

This invention relates to airplane fuselages. More specifically it relates to fuselage compartments for housing safety equipment as described in U.S. Patent application Serial No. 2,311,139, filed October 17, 1962, entitled Safety Equipment for Aircraft of All Type, to which the present invention relates.

One object of the present invention is to provide an airplane fuselage having a plurality of housings on the fuselage underside for containing aircraft safety equipment therein, each of the housings including a slideable access door for exposing the safety equipment located therewithin to the outside during operative use.

Another object of the present invention is to provide a fuselage having a plurality of housings for containing aircraft safety equipment, wherein the access doors in a closed position present a continued streamlined contour to the fuselage and do not in any way impair the air flow thereacross.

Still another object of the present invention is to provide a plurality of safety equipment housings having access doors which are remotely controlled for movement between a closed and an open position.

Other objects of the present invention are to provide an aircraft fuselage having safety equipment housings having opening means to the outer bottom side of the craft, which are quickly and easily operative in a trouble-free manner.

For further objects and for a better understanding of the invention, reference may be had to the following detailed description taken in conjunction with the accompanying drawing in which:

FIGURE 1 is a fragmentary bottom perspective view of an airplane incorporating a plurality of housings which comprise the present invention.

FIGURE 2 is a bottom plan view of an airplane shown diagrammatically and indicating the structure which forms the present invention.

FIGURE 3 is a fragmentary perspective view of one of the safety equipment housings.

FIGURE 4 is a cross section through 4—4 of FIGURE 3 showing an access door in open position, and FIGURE 5 is a cross sectional view similar to FIGURE 4 in part, and showing an access door in closed position.

Referring now to the drawing in detail the numeral 10 represents an aircraft according to the present invention wherein there is a fuselage 11, wings 12 and tail fin 13.

The fuselage is provided with a built-in safety equipment as described in the above cited patent application, and which comprises an inflatable air blanket normally stored within one side of the fuselage and which for operative use is drawn downwardly underneath the fuselage to the opposite side thus placing the blanket in operative position below the aircraft where it is then inflated for purpose of serving as a life raft for the craft in case of emergency landing upon the seat, or serving as a cushion in case of disabled landing upon the ground. Such air blanket is kept stored in folded inoperative position within a longitudinal compartment within one side of the airplane, the compartment having a longitudinal hinged door 14 along the outer side 15 of the fuselage through which the air blanket is drawn outward and under the fuselage. In order to draw the air blanket into this position, a plurality of cords 16 are fastened to the leading edge of the blanket and the cords extend under the fuselage, then through openings on the opposite side of the fuselage into a longitudinal compartment on this opposite side within which there is a winch to wind up the cord.

In view that the cords are normally at all times maintained underneath the fuselage it is apparent that they will present a disruption of the normal stream lined air flow therebeneath during flight unless they are enclosed within the contour of the fuselage hull, when the safety equipment is not in use.

Accordingly the present fuselage includes a bottom portion 18 having a plurality of housing stations 19 within which the cords are enclosed when not in operation.

Each housing station comprises a transversely extending channel 20 formed upwardly in the bottom 18 through which the cord passes below the fuselage. In order to enclose the channel, a door 21 is normally placed therebelow, and the fuselage bottom is depressed as shown at 22 so that the outer side of the door is flush with the outer side of the fuselage as shown in FIGURES 3 and 5.

As shown in FIGURES 3 and 4 when it is necessary to expose the cord for operation of the safety equipment, the door is moved from the position illustrated in FIGURE 3 to the position shown in FIGURE 4. The door may be made to be slidable therebetween and retained during movement between guide elements (not shown) or be retained by guide pins 23, 24 at opposite longitudinal ends 25 of the door which travel within tracks 26, 27 respectively of the fuselage.

Along one longitudinal side of the depression 22 there is a recess 28 within which the edge 29 of the door fits in closed position. On the opposite side of the depression there is a longitudinal roller 30 over which the door moves relatively frictionless. A stop block 31 is provided to engage a shoulder 32 of the door to limit the door's opening position. A plurality of upward extending studs 33 on each door are affixed to chains 34 which extend longitudinally within the fuselage. A stiff cross rod 35 is likewise affixed in parallel relation to the doors near one end of the chains, and the terminal ends of the chain are affixed on a winch drum 36 which may be revolved by means of an electric motor 37 connected thereto. At their opposite ends the chains are connected to relatively strong springs 38 secured to the framework of the airplane as shown in FIGURES 2 and 5.

In a modified construction, a secondary cross rod, winch drum and motor may be connected at the opposite ends of the chains 34 in lieu of the spring 38 construction.

In operative use when it is necessary to expose the cords for emergency purposes, the motor 37 may be activated electrically from a control panel located elsewhere on the airplane. This will cause the winch drum to rotate and wind the chains 34 thereupon. Such action will cause all doors 21 to open simultaneously. The leading edge of the door will first move upwardly along the course of track 27, move over roller 30, then move forward adjacent the inner side of the fuselage bottom. The trailing edge of the door will first move forwardly so edge 29 will clear groove 28, then rise upwardly bringing the door within the fuselage, then continue forwardly until it is out of the way of cord 16.

To close the doors, the motor is reversed and springs 38 return the doors each into closed position flush on outer side with the outer side of the hull. In case the secondary motor and winch drum are employed, these are then activated to accomplish the same.

Thus there has been shown a mechanism wherein the doors are simultaneously moved out of the way to within the inner side of the fuselage where they will not snag or otherwise tear the air blankets.

While various changes may be made in the detail construction, it is understood that such changes shall be within the spirit and scope of the present invention as defined by the appended claims.

What I claim as new and desire to secure by Letters Patent of the United States is:

1. In an airplane including a fuselage and airfoils for providing lift, and further including safety equipment requiring a plurality of transverse cords on the underside of said fuselage, the combination of a plurality of parallel transverse cord housings, each of said housings comprising a transverse upward depression, a door, means for movement of said door from a closed position to an open position, said door in a closed position being within said depression and flush with the outer side of said fuselage and said door in an open position being retracted inwardly within said fuselage.

2. In an airplane having safety equipment incorporating transverse cords on the underside thereof, the combination as set forth in claim 1 wherein said movement means comprises a plurality of parallel longitudinally extending chains affixed to each of said housing doors, power means at each opposite ends of said chains to simultaneously move all of said chains and said doors longitudinally relative to said fuselage.

3. In an airplane having safety equipment incorporating transverse cords on the underside thereof, the combination as set forth in claim 2 wherein each of said doors is of a configuration conforming to the contour of the fuselage, each of said doors having guide pins, and each of said depressions having tracks for receiving said guide pins for movement therewithin.

References Cited in the file of this patent
UNITED STATES PATENTS

| | | |
|---|---|---|
| 3,028,130 | Burton | Apr. 3, 1962 |
| 3,060,465 | Carstensen | Oct. 30, 1962 |